United States Patent
Yang et al.

(10) Patent No.: US 8,350,987 B2
(45) Date of Patent: Jan. 8, 2013

(54) BACKLIGHT UNIT AND LIQUID CRYSTAL DISPLAY DEVICE HAVING THE SAME

(75) Inventors: Seung Hoon Yang, Daegu (KR); Yeoun Jei Jung, Daegu (KR)

(73) Assignee: LG Display Co. Ltd., Seoul (KR)

( * ) Notice: Subject to any disclaimer, the term of this patent is extended or adjusted under 35 U.S.C. 154(b) by 414 days.

(21) Appl. No.: 12/626,340

(22) Filed: Nov. 25, 2009

(65) Prior Publication Data

US 2010/0309410 A1 Dec. 9, 2010

(30) Foreign Application Priority Data

Jun. 8, 2009 (KR) ........................ 10-2009-0050508

(51) Int. Cl.
G02F 1/1343 (2006.01)
G02F 1/1335 (2006.01)

(52) U.S. Cl. ................. 349/64; 349/58; 349/61; 349/62; 362/616; 362/623

(58) Field of Classification Search ................ 349/64, 349/65; 362/616, 623
See application file for complete search history.

(56) References Cited

U.S. PATENT DOCUMENTS

| | | | |
|---|---|---|---|
| 2002/0089840 A1* | 7/2002 | Kawakami et al. | 362/31 |
| 2005/0264716 A1* | 12/2005 | Kim et al. | 349/61 |
| 2007/0126948 A1* | 6/2007 | Kim et al. | 349/61 |
| 2007/0258030 A1* | 11/2007 | Kimura et al. | 349/122 |
| 2008/0239199 A1* | 10/2008 | Wakaki et al. | 349/62 |

* cited by examiner

*Primary Examiner* — Huyen Ngo
(74) *Attorney, Agent, or Firm* — Brinks Hofer Gilson & Lione

(57) ABSTRACT

A backlight unit adapted to enhance brightness and reduce manufacturing time and costs is disclosed. The backlight unit includes a bottom cover with an opened upper surface, a plurality of light emission diodes arranged on an inner edge of the bottom cover, a light guide plate disposed parallel to the plurality of light emission diodes, and a diffusion sheet disposed on the light guide plate. The diffusion sheet is provided to have an overlapped area with a support main which is combined with the bottom cover. Also, a reflection material layer is formed on an upper surface of the diffusion sheet corresponding to the overlapped area.

9 Claims, 3 Drawing Sheets

BACKLIGHT UNIT AND LIQUID CRYSTAL DISPLAY DEVICE HAVING THE SAME

This application claims the benefit of Korea Patent Application No. 10-2009-0050508, filed on Jun. 8, 2009, the entire contents of which is incorporated herein by reference for all purposes as if fully set forth herein.

BACKGROUND

1. Field of the Invention

This disclosure relates to a backlight unit, and more particularly, to a backlight unit adapted to enhance brightness and reduce manufacturing time and costs, as well as a liquid crystal display device having the same.

2. Discussion of the Related Art

Cathode ray tubes (CRTs), which are widely used display devices, are mainly used as TVs or monitors for measuring apparatuses or information terminals. However, the heavy weight and large size of CRTs have been a major hindrance to the manufacturing of small, light electronic products.

To address this matter, LCD devices are gradually being used in a wide range of applications due to their advantages such as lightness, thinness, and low power consumption. Accordingly, LCD devices are being manufactured to have even larger screens, be thinner, and consume less power. Such LCD devices display images by controlling the amount of light transmitted through liquid crystal.

LCD devices are not self-illuminating display devices, unlike CRTs. As such, an LCD device includes a backlight unit provided on the rear surface of an LCD panel. The backlight unit includes a separated light source providing the light necessary to display an image. Actually, the backlight unit employs a plasma type light source such as a cold cathode fluorescent lamp (CCFL), a hot cathode fluorescent lamp (HCFL), an external electrode fluorescent lamp (EEFL), an external and internal electrode fluorescent lamp (EIFL), or others. Alternatively, the backlight unit uses a white light emission diode (LED) as a light source. Particularly, the white LED configured to emit white light is widely used in the backlight unit because of its features of long lifespan, low power consumption, small size, durability, and others.

FIG. 1 is a cross-sectional view showing a backlight unit according to the related art.

As shown in FIG. 1, a backlight unit of the related art includes a printed circuit board (PCB) 51 which is disposed on an edge of the inner side of a bottom cover 90 and loaded with a plurality of LEDs 50. The backlight unit further includes a reflection sheet 80, a light guide plate 40, and optical sheets 30 which are sequentially received into the bottom cover 90. The bottom cover 90 is combined with a support main 15 in order to secure the reflection sheet 80, the light guide plate 40, and the optical sheets 30. The PCB 51 is attached onto the inner surface of a side wall of the bottom cover 90 by means of a first adhesive tape 60.

Furthermore, the backlight unit includes a light reflection housing 81 disposed on a rear surface region of the support main 15 which is overlapped with the light guide plate 40. The light reflection housing 81 is attached onto the rear surface region of the support main 15 by a second adhesive tape 61. The light reflection housing 81 minimizes light leakage caused by light which is emitted toward the support main 15, when the LEDs 50 emits lights.

Such a configuration of the related art backlight unit causes gaps between the light reflection housing 81 and the light guide plate 40 as well as between the light reflection housing 81 and the optical sheets 30, by assembly tolerances. These gaps make it difficult to improve brightness deterioration in the incident portion of the light guide plate 40 which receives light from the LEDs 50, even though the related art backlight unit includes the light reflection housing 81. Moreover, the light reflection housing 81 and second adhesive tape 61 corresponding to additional parts of the related art backlight unit increase the manufacturing time and costs.

BRIEF SUMMARY

A backlight unit includes: a bottom cover with an opened upper surface; a plurality of light emission diodes arranged on an inner edge of the bottom cover; a light guide plate disposed parallel to the plurality of light emission diodes; and a diffusion sheet disposed on the light guide plate. The diffusion sheet is provided to have an overlapped area with a support main which is combined with the bottom cover. Also, a reflection material layer is formed on an upper surface of the diffusion sheet corresponding to the overlapped area.

An LCD device according to another aspect of the present disclosure includes: a bottom cover with an opened upper surface; a plurality of light emission diodes arranged on an inner edge of the bottom cover; a light guide plate disposed parallel to the plurality of light emission diodes; a diffusion sheet disposed on the light guide plate; and a liquid crystal display panel disposed over the diffusion sheet. The diffusion sheet is provided to have an overlapped area with a support main which is combined with the bottom cover. Also, a reflection material layer is formed on an upper surface of the diffusion sheet corresponding to the overlapped area.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure.

DETAILED DESCRIPTION OF THE DRAWINGS AND THE PRESENTLY PREFERRED EMBODIMENTS

Figure 1:
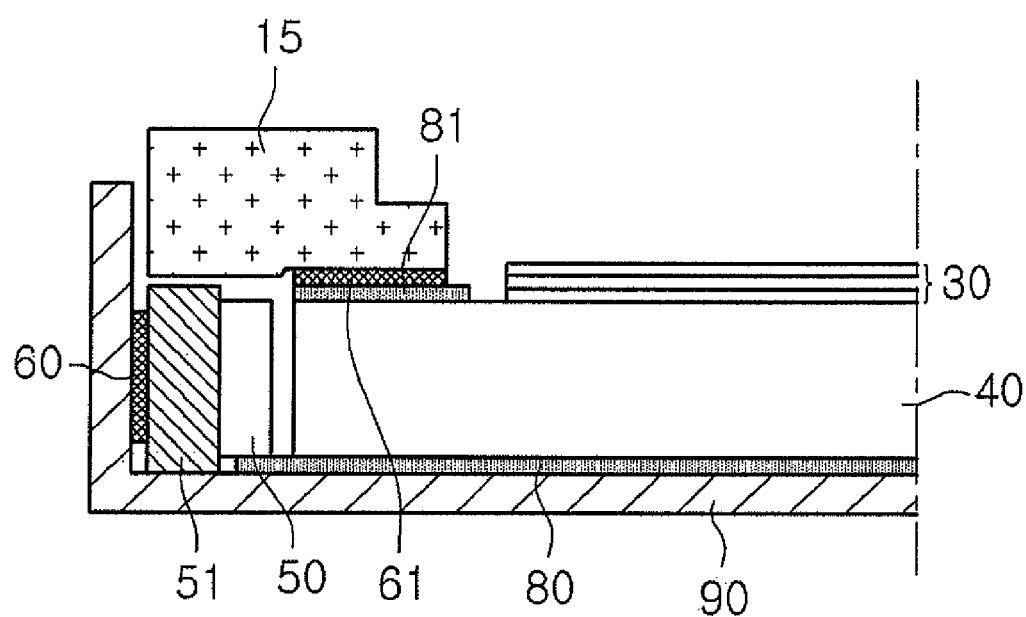
FIG. 1 is a cross-sectional view showing a backlight unit according to the related art.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
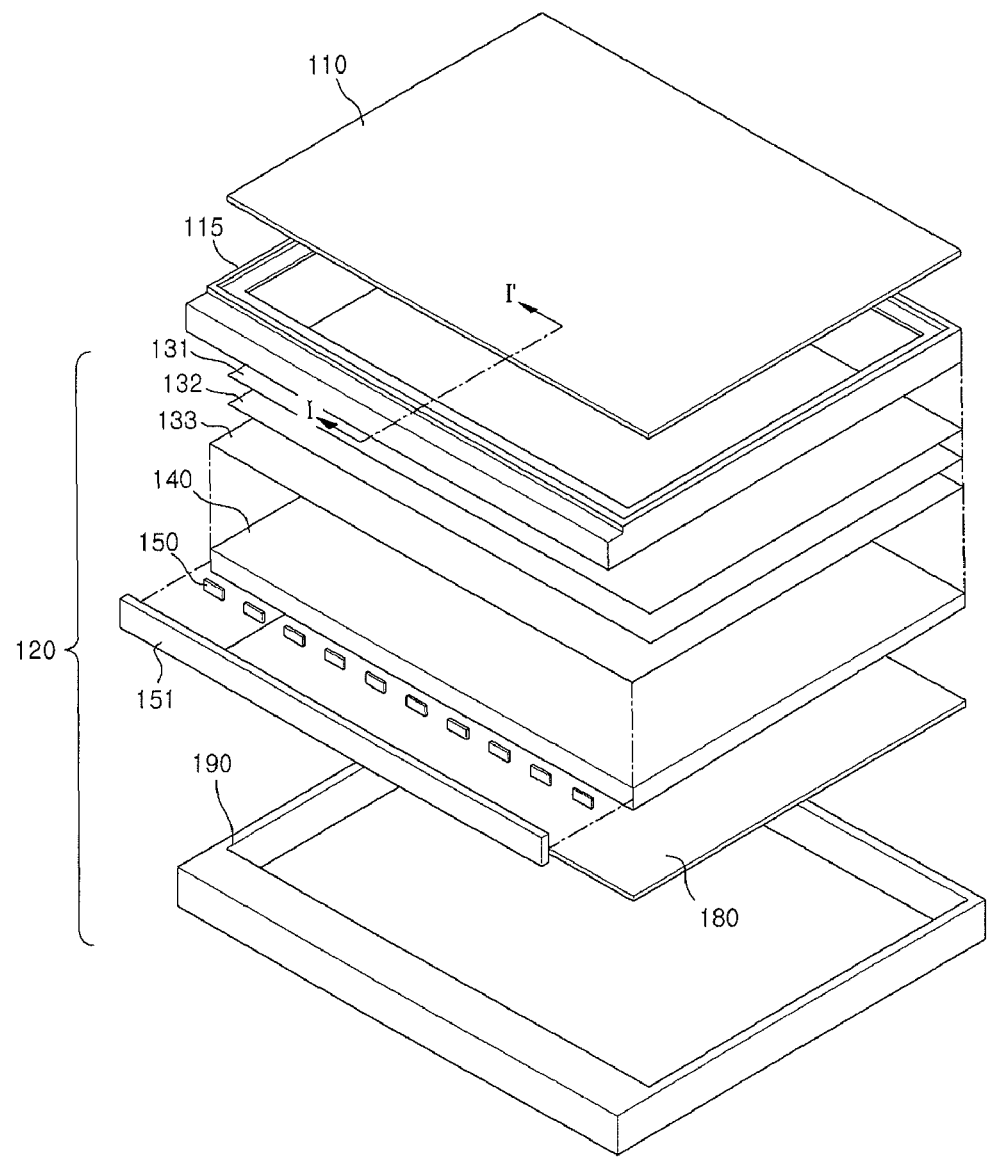
FIG. 2 is a disassembled perspective view showing an LCD device with a backlight unit according to an embodiment of the present disclosure.
Figure 3:
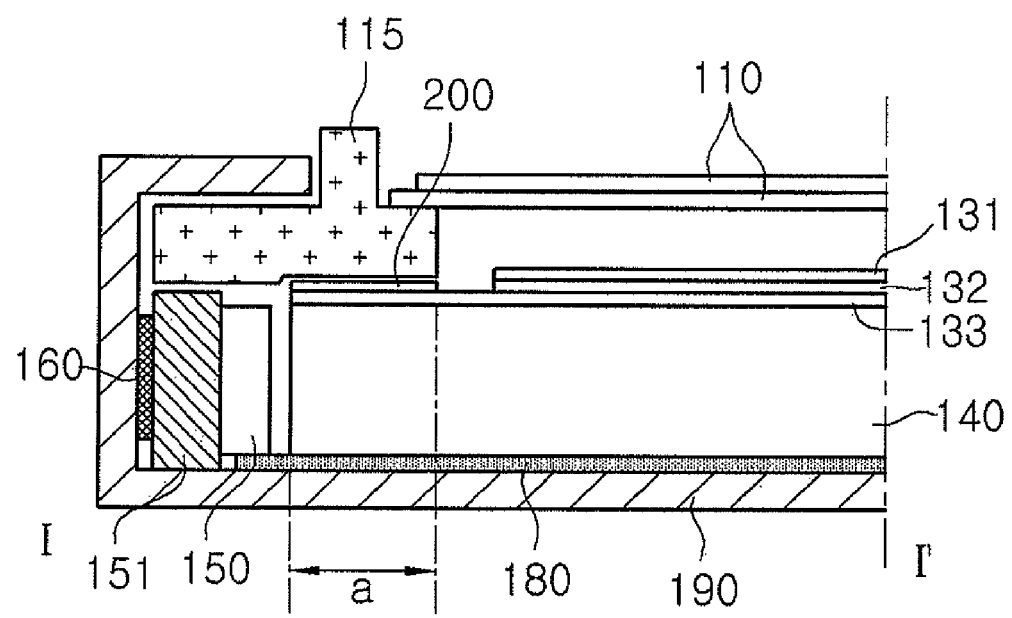
FIG. 3 is a cross-sectional view showing an LCD device taken along a line I-I' in FIG. 2.

FIG. 2 is a disassembled perspective view showing an LCD device with a backlight unit according to an embodiment of the present disclosure. FIG. 3 is a cross-sectional view showing an LCD device taken along a line I-I' in FIG. 2.

Referring to FIGS. 2 and 3, an LCD device according to an embodiment of the present disclosure includes an LCD panel 110 configured to display images, a support main 115 configured to support the edges of the LCD panel 110, and a backlight unit 120 configured to apply light to the LCD panel 110. The backlight unit 120 is disposed on the rear surface of the LCD panel 110.

Although it is not shown in detail in the drawings, the LCD panel 110 includes a thin film transistor substrate and a color filter substrate disposed opposite to each other and combined to maintain a cell gap between them, as well as a liquid crystal layer interposed between the two substrates. More specifically, on the thin film transistor substrate, a plurality of gate lines and a plurality of data lines are formed to cross each other and define a plurality of pixels, and a plurality of transistors TFT are formed at the intersections of the plurality of gate lines and the plurality of data lines. Each of the thin film transistors is connected to a pixel electrode within each of the pixels. The color filter substrate includes a plurality of red, green, and blue (RGB) color filters, a black matrix, and a common electrode. Each of the color filters is formed on the respective pixel. The black matrix is formed on the edges of the color filters and screens the gate lines, the data lines, and the thin film transistors. The common electrode is formed to cover all of the color filters and the black matrix.

The LCD device further includes a gate driver (not shown) and a data driver (not shown) which are disposed on edges of the LCD panel 110. The gate driver is electrically connected to the gate lines, and the data driver is connected to the data lines. The gate driver applies scan signals to the gate lines, and the data driver also applies data signals to the data lines.

Alternatively, the gate and data drivers are mounted on tape carrier packages of a tab shape and connected to the LCD panel 110. In this case, the gate and data drivers apply the scan signals and the data signals to the plurality of gate lines and the plurality of data lines formed on the LCD panel 110, thereby driving the plurality of pixels on the LCD panel 110.

The backlight unit 120 disposed under the LCD panel 110 includes a box-shaped bottom cover 190 with an opened upper surface, a PCB 151 disposed on an edge of the inner side of the bottom cover 190, and a plurality of LEDs 150 mounted on the PCB 151. The backlight unit 120 further includes a light guide plate 140 disposed parallel to the plurality of LEDs 150, a reflection sheet 180 disposed under the light guide plate 140, and optical sheets 131 to 133 disposed on the light guide plate 140. The light guide plate 140 is configured to convert spotted incident lights from the LEDs 150 into two-dimensional light. The reflective sheet 180 reflects light progressing downward from the light guide plate 140 toward the LCD panel 110. The optical sheets 131 to 133 are configured to disperse and converge light from the light guide plate 140.

The LEDs 150 include a configuration consisting of only white LEDs, another configuration consisting of red, green, and blue LEDs, or still another configuration consisting of white, red, green, and blue LEDs. The LEDs 150 are mounted on one surface of the PCB 151. The PCB 151 can be formed from a metal material with superior thermal conductivity, so as to rapidly transfer heat generated in the LEDs 150 to the bottom cover 190 of a metal material. The PCB 151 is secured onto the inner surface of a side wall of the bottom cover 190 by means of an adhesive tape 160. The adhesive tape 160 attached to the other surface of the PCB 151 can be formed to include a conductive material, in order to rapidly transfer heat from the PCB 151 loaded with the LEDs 150 to the bottom cover 190.

The optical sheets 130 include a diffusion sheet 133, a convergent sheet 132, and a protective sheet 131 sequentially stacked on the light guide plate 140. The diffusion sheet 133 is opposite to the entire surface of the light guide plate 140. In other words, the diffusion sheet 133 can be formed to have the same size as the surface of the light guide plate 140. As such, the diffusion sheet 133 has an edge area (i.e., an overlapped area "a") overlapping a part of the support main 115.

The overlapped area "a" of the diffusion sheet 133 and the support main 115 corresponds to a light leakage area in which light generated in the LEDs 150 leaks out. In order to prevent the light leakage, a reflection material layer 200 is coated on the overlapped area "a" of the diffusion sheet 133. More specifically, the reflection material layer 200 is formed on a part of the upper surface of the diffusion sheet 133 corresponding to the overlapped area "a" between it and the support main 115, through a printing process.

Alternatively, the reflection material layer 200 can be formed on a part of the lower surface of the diffusion sheet 133 which corresponds to the overlapped area "a" of the support main 115 and the diffusion sheet 133. In this case, the reflection material layer 200 can be deformed by heat generated in the LEDs 150 and cause light to be refracted. As such, brightness in an incident portion of the light guide plate 140 can lose uniformity. In view of these points, the reflection material layer 200 is preferably formed on a part of the upper surface of the diffusion sheet 133.

The convergent sheet 132 and the protective sheet 131 are sequentially disposed on the diffusion sheet 133 without overlapping the support main 115, unlike the diffusion sheet 133 on the upper surface of the light guide plate 140.

In the backlight unit according to an embodiment of the present disclosure, it is explained that the diffusion sheet 133 (more specifically, the lower surface of the diffusion sheet 133) is formed in the same size as the upper surface of the light guide plate 140. However, the present embodiment is not limited this. In other words, the diffusion sheet 133 can be formed in a smaller size than the upper surface of the light guide plate 140 as long as it overlaps the support main 115.

As described above, the backlight unit 120 according to an embodiment of the present disclosure allows the diffusion sheet 133 on the light guide plate 140 to overlap the support main 115 by the overlapped area "a". Also, the backlight unit 120 includes the reflection material layer 200 coated on the upper surface of the diffusion sheet 133 which corresponds to the overlapped area "a". Therefore, the brightness deterioration in the incident portion of the light guide plate 140 can be prevented.

Moreover, the backlight unit 120 of the present embodiment removes the adhesive tape which is used to attach the light reflection housing to the support main in the related art backlight unit. As such, the backlight unit 120 of the present embodiment can reduce the assembling time and costs.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. A backlight unit comprising:
a bottom cover with an opened upper surface;
a plurality of light emission diodes arranged on an inner edge of the bottom cover;
a light guide plate disposed parallel to the plurality of light emission diodes; and
a diffusion sheet disposed on the light guide plate,
wherein the diffusion sheet is provided to have an overlapped area with a support main which is combined with the bottom cover, and a reflection material layer is coated on an upper surface of the diffusion sheet corresponding to the overlapped area
wherein the reflection material layer is formed between the support main and the diffusion sheet.

2. The backlight unit claimed as claim 1, wherein the diffusion sheet is formed to have the same size as an upper surface of the light guide plate.

3. The backlight unit claimed as claim 1, further comprising a convergent sheet and a protective sheet sequentially stacked on the diffusion sheet.

4. The backlight unit claimed as claim 3, wherein the convergent sheet and the protective sheet are disposed without overlapping the support main.

5. A liquid crystal display device comprising:
a bottom cover with an opened upper surface;
a plurality of light emission diodes arranged on an inner edge of the bottom cover;
a light guide plate disposed parallel to the plurality of light emission diodes;
a diffusion sheet disposed on the light guide plate; and
a liquid crystal display panel disposed over the diffusion sheet,
wherein the diffusion sheet is provided to have an overlapped area with a support main which is combined with the bottom cover, and a reflection material layer is coated on an upper surface of the diffusion sheet corresponding to the overlapped area;
wherein the reflection material layer is formed between the support main and the diffusion sheet.

6. The liquid crystal display device claimed as claim 5, wherein the diffusion sheet is formed to have the same size as an upper surface of the light guide plate.

7. The liquid crystal display device claimed as claim 5, further comprising a convergent sheet and a protective sheet sequentially stacked between the diffusion sheet and the liquid crystal display panel.

8. The liquid crystal display device claimed as claim 7, wherein the convergent sheet and the protective sheet are disposed without overlapping the support main.

9. The liquid crystal display device claimed as claim 5, wherein the support main has a protruded region in order to fix the liquid crystal display panel.

* * * * *

UNITED STATES PATENT AND TRADEMARK OFFICE
CERTIFICATE OF CORRECTION

PATENT NO. : 8,350,987 B2  
APPLICATION NO. : 12/626340  
DATED : January 8, 2013  
INVENTOR(S) : Seung Hoon Yang et al.

It is certified that error appears in the above-identified patent and that said Letters Patent is hereby corrected as shown below:

In the Claims

In column 5, claim 1, line 16, before "diffusion sheet is provided" replace "the" with --a--.

In column 6, claim 5, line 10, before "diffusion sheet is provided" replace "the" with --a--.

Signed and Sealed this
Twenty-first Day of May, 2013

Teresa Stanek Rea
*Acting Director of the United States Patent and Trademark Office*